Dec. 24, 1929.  A. SHUMAN  1,740,749
SKYLIGHT CONSTRUCTION
Filed Sept. 14, 1927  2 Sheets-Sheet 1

WITNESS:
Robt R Mitchel

INVENTOR
Arno Shuman
BY
Augustus B. Stoughton.
ATTORNEY.

Dec. 24, 1929.     A. SHUMAN     1,740,749
SKYLIGHT CONSTRUCTION
Filed Sept. 14, 1927     2 Sheets-Sheet 2

WITNESS:
Rob<sup>t</sup> P Kitchel.

INVENTOR
Arno Shuman
BY
Augustus B. Stoughton.
ATTORNEY.

Patented Dec. 24, 1929

1,740,749

UNITED STATES PATENT OFFICE

ARNO SHUMAN, OF PHILADELPHIA, PENNSYLVANIA

SKYLIGHT CONSTRUCTION

Application filed September 14, 1927. Serial No. 219,377.

Corrugated iron or steel sheets and other corrugated sheets as of asbestos or asbestos covered metal are extensively used in the construction of buildings both as roofs and sides. It is the object of the present invention to provide a skylight structure portable and adapted to be carried in stock as a unit and interchangeable in use with such corrugated building sheets so that a skylight can be readily provided either in the roof or wall wherever required.

Other objects of the invention will appear from the following description at the end of which the invention will be claimed although generally stated, the invention may be said to comprise a skylight structure portable as a unit and comprising a rectangular corrugated metal building sheet having a generally central rectangular opening therein, a rectangular pane or piece of glass covering said opening and lapping its boundary walls, metal strips overlying three side edges of the glass and conforming to the surface thereof and to the corrugations of said metal sheet and secured thereto, and a support for the fourth side edge of the glass secured to said sheet.

In the accompanying drawings to which reference will be made

Figure 1:
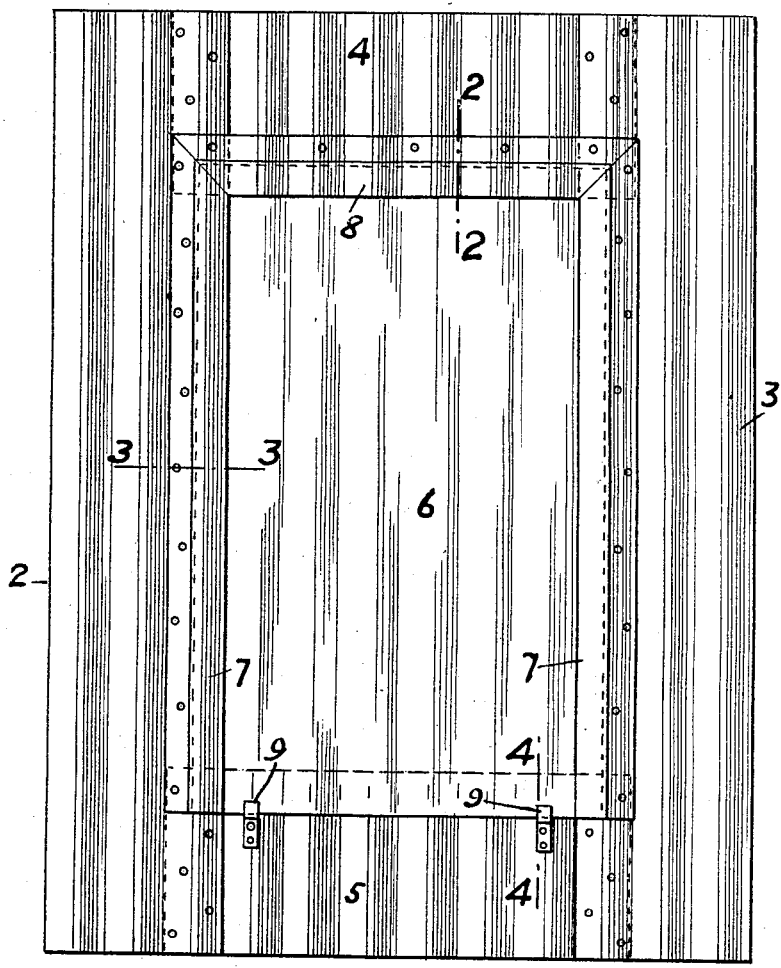
Figure 1 is a top or plan view of a skylight embodying features of the invention.
Figure 5:
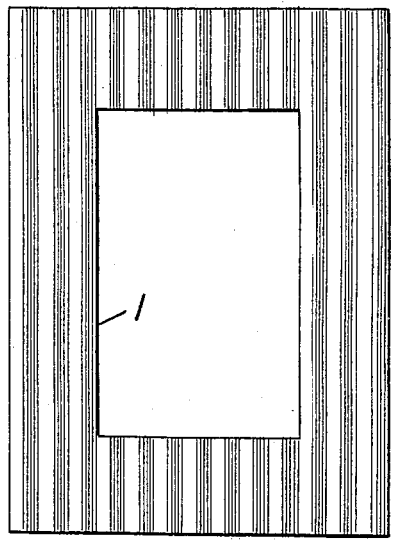
Fig. 5 is a top or plan view drawn to a reduced scale showing the building sheet constructed of one piece.
Figure 6:
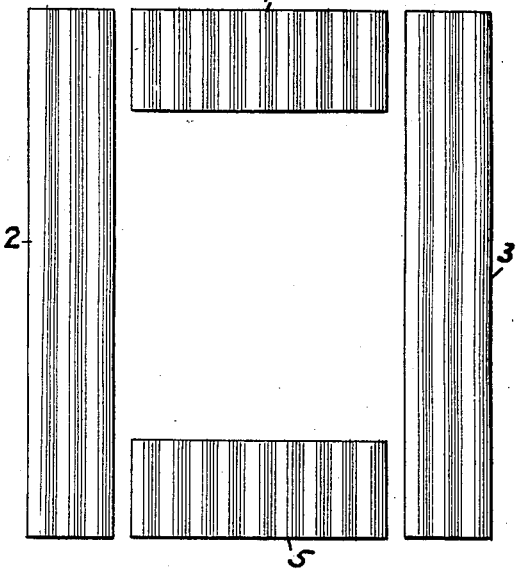
Fig. 6 is a similar view showing the building sheet constructed of several pieces.

There is a rectangular corrugated metal building sheet having a generally central rectangular opening 1 therein. The word metal is used to include all material of which corrugated building sheets are made. This sheet may well correspond in dimensions with stock sheets. As shown in Fig. 5, this sheet is made of one piece and has the opening 1 punched through it. As shown in Figs. 1 and 6, this sheet is made of four pieces 2, 3, 4 and 5, and the end pieces 4 and 5 are lapped in respect to the side pieces and riveted or otherwise secured to place. The construction last described has the advantage of effecting a saving in respect to waste.

Figure 2:
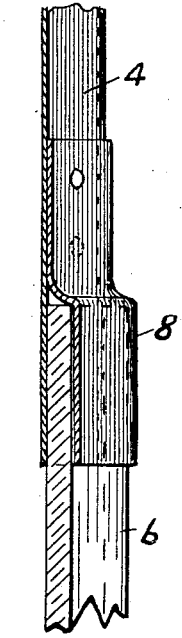
Fig. 2 is a sectional view drawn to an enlarged scale and taken on the line 2—2 of Fig. 1.
Figure 3:
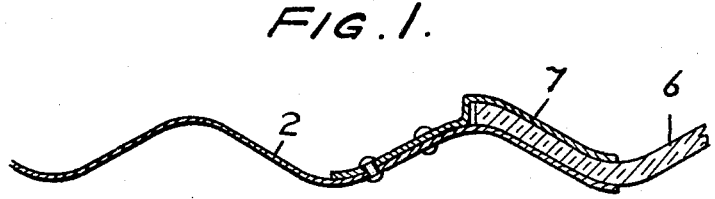
Fig. 3 is a similar view taken on the line 3—3 of Fig. 1.
Figure 4:
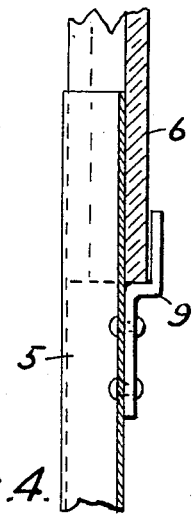
Fig. 4 is a similar view taken on the line 4—4 of Fig. 1.

Referring more particularly to Figs. 1 to 4, 6 is a rectangular pane or piece of corrugated glass and it may be plain or wire glass. This glass 6 covers the opening 1 and laps its bounding walls. 7 and 8 are metal strips lapping three side edges of the glass 6. The strips 7 are corrugated to conform to the glass and to the building sheet and they are riveted or otherwise attached to the latter as shown in Fig. 3, so that the glass 6 is held between the strips 7 and the sheet. In this case the corrugations extend lengthwise. The strip 8 is also corrugated to conform to the corrugations of the sheet and of the glass and as shown in Fig. 2 the glass lies between the strip 8 and the sheet. The strip 8 is of course secured to the sheet. It follows from this construction that the glass may be readily slid into position to be held by the strips 7 and 8. In order to keep the glass from falling out there is provided at the fourth edge of the glass a stop or support of which the cleats 9 are an example. Of course if desired or necessary cement or other material may be used for providing tight joints.

Figure 7:
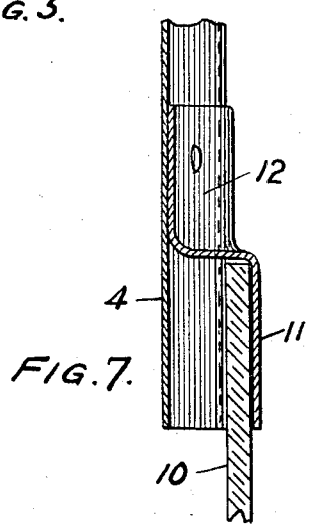
Fig. 7 is a view similar to Fig. 2 but illustrating the employment of flat instead of corrugated glass.
Figure 8:
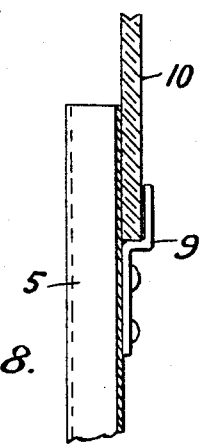
Fig. 8 is a view similar to Fig. 4 also showing flat glass.
Figure 9:
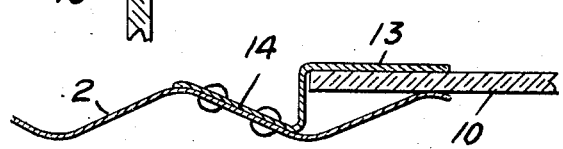
Fig. 9 is a view similar to Fig. 3 but showing flat glass.

The construction and operation of the modification shown in Figs. 7 to 9 are as above described except that the glass 10 is flat instead of being corrugated so that the portion 11 of the strip 12 is flat instead of corrugated. In Fig. 9 the portion 13 of the strip 14 which conforms to the glass is also flat.

All the metal strips are of course offset as clearly appears from the drawings.

It will be obvious to those skilled in the art to which the invention relates that modifications may be made in details of construction and arrangement and in matters of mere form without departing from the spirit of the invention which is not limited to such matters or otherwise than the prior art and the appended claims may require.

I claim:

1. A skylight structure portable as a unit comprising a rectangular corrugated metal building sheet having a generally central rectangular opening therein, a generally rectangular pane of glass covering said opening and overlapping its bounding walls, metal strips lapping three side edges of the glass and conforming to the surface thereof and to the corrugations of said metal sheet and secured to the latter, and a support for the fourth side edge of the glass secured to said sheet.

2. A skylight portable as a unit and comprising a rectangular corrugated building sheet consisting of side and end pieces of which the end pieces lap and are secured to the side pieces providing a generally central rectangular opening therein, a generally rectangular pane of glass covering said opening and overlapping its bounding walls, metal strips lapping three side edges of the glass and conforming to the surface thereof and to the corrugations of said metal sheet and secured to the latter, and a support for the fourth side edge of the glass secured to said sheet.

3. A skylight structure portable as a unit and comprising a rectangular corrugated metal building sheet having a generally central rectangular opening therein, a generally rectangular pane of corrugated glass covering said opening and lapping and conforming to the corrugations of its bounding walls, metal strips lapping three side edges of the glass and corrugated in conformity with the glass of the sheet and secured thereto, and a support for the fourth side edge of the glass secured to said sheet.

ARNO SHUMAN.